(12) United States Patent
Musoll

(10) Patent No.: US 12,001,333 B1
(45) Date of Patent: Jun. 4, 2024

(54) EARLY POTENTIAL HPA GENERATOR

(71) Applicant: Astera Labs, Inc., Santa Clara, CA (US)

(72) Inventor: Enrique Musoll, San Jose, CA (US)

(73) Assignee: Astera Labs, Inc., Santa Clara, CA (US)

(*) Notice: Subject to any disclaimer, the term of this patent is extended or adjusted under 35 U.S.C. 154(b) by 64 days.

(21) Appl. No.: 17/962,210

(22) Filed: Oct. 7, 2022

(51) Int. Cl.
*G06F 12/06* (2006.01)

(52) U.S. Cl.
CPC .. *G06F 12/0646* (2013.01); *G06F 2212/7201* (2013.01)

(58) Field of Classification Search
CPC ........... G06F 12/063; G06F 2212/1024; G06F 12/1027; G06F 12/0835; G06F 12/0868; G06F 12/0646
See application file for complete search history.

(56) References Cited

U.S. PATENT DOCUMENTS

| | | | |
|---|---|---|---|
| 2020/0026661 A1* | 1/2020 | Kounavis | G06F 12/0835 |
| 2022/0004488 A1* | 1/2022 | Paul | G06F 12/0607 |
| 2022/0374354 A1* | 11/2022 | Muthrasanallur | G06F 12/1009 |
| 2023/0099243 A1* | 3/2023 | Kapsalakis | H04L 43/06 709/224 |
| 2023/0393930 A1* | 12/2023 | Balluchi | G06F 3/0619 |

* cited by examiner

*Primary Examiner* — Schquita D Goodwin
*Assistant Examiner* — Linh T. Nguyen
(74) *Attorney, Agent, or Firm* — Shield Intellectual Property PC; Zhichong Gu

(57) ABSTRACT

Symbols are received, from a first computing device by a second computing device, across lanes of a communication link. A physical layer extracted HPA (or eHPA) is generated from the symbols while operations at a physical layer of a receiving (Rx) protocol stack of the second computing device are being performed. The eHPA is generated before other operations at other layers of the Rx protocol stack are finished. The eHPA is used to perform one or more operations for memory access before a normative message is formed by operations of the receiving protocol stack implemented in a communication interface of the second computing device.

20 Claims, 10 Drawing Sheets

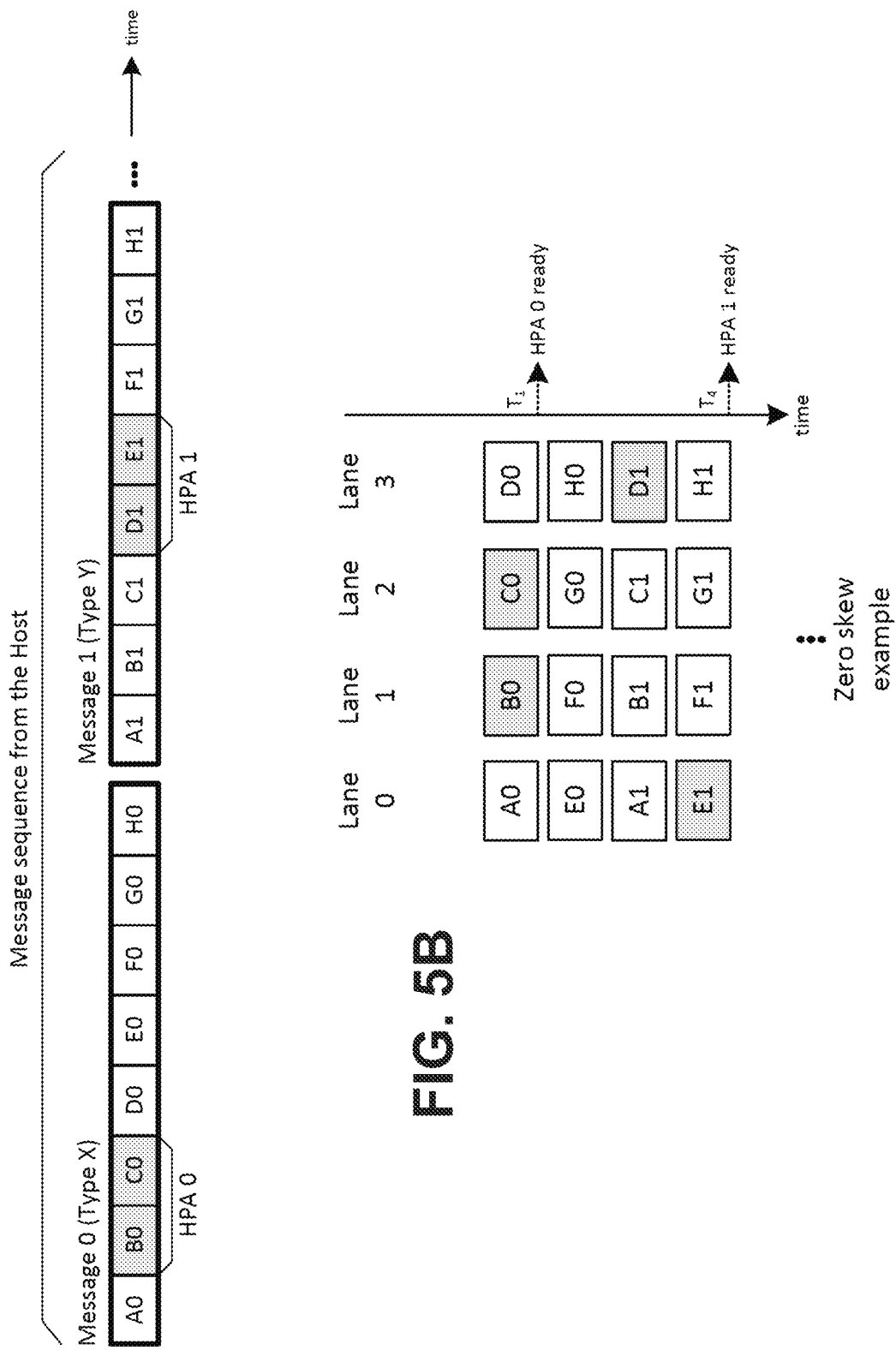

receive symbols across lanes of a communication link 702 generate an eHPA from the symbols 704 use the eHPA to perform operations for memory access 706

FIG. 7

EARLY POTENTIAL HPA GENERATOR

TECHNICAL FIELD

Embodiments relate generally to computing systems, and, more specifically, to early potential host physical address (HPA) generation in memory access operations involving host and non-host computing systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The explosion of data and mainstreaming of specialized workloads—like artificial intelligence (AI) and machine learning (ML)—have given rise to heterogeneous computing in which graphics processing units (GPUs) and/or AI processors and/or other expanders or accelerators such as memory expanders/accelerators work side-by-side with host computing devices such as (e.g., general-purpose, etc.) central processing units or CPUs. Peripheral Component Interconnect Express (PCIe) and/or Compute Express Link (CXL) connectivity solutions can be built to enable relatively simple or complex topologies of various devices, memories, processors, servers, etc., to expand memory and accelerate workloads in a flexible, responsive and efficient way, while at the same time improving availability, bandwidth and performance.

BRIEF DESCRIPTION OF THE DRAWINGS

The present inventive subject matter is illustrated by way of example, and not by way of limitation, in the figures of the accompanying drawings and in which like reference numerals refer to similar elements and in which:

FIG. 5A through FIG. 5D illustrate example physical layer HPA extraction operations from host-to-device messages;

FIG. 7 illustrates an example process flow; and

DETAILED DESCRIPTION

Figure 1:
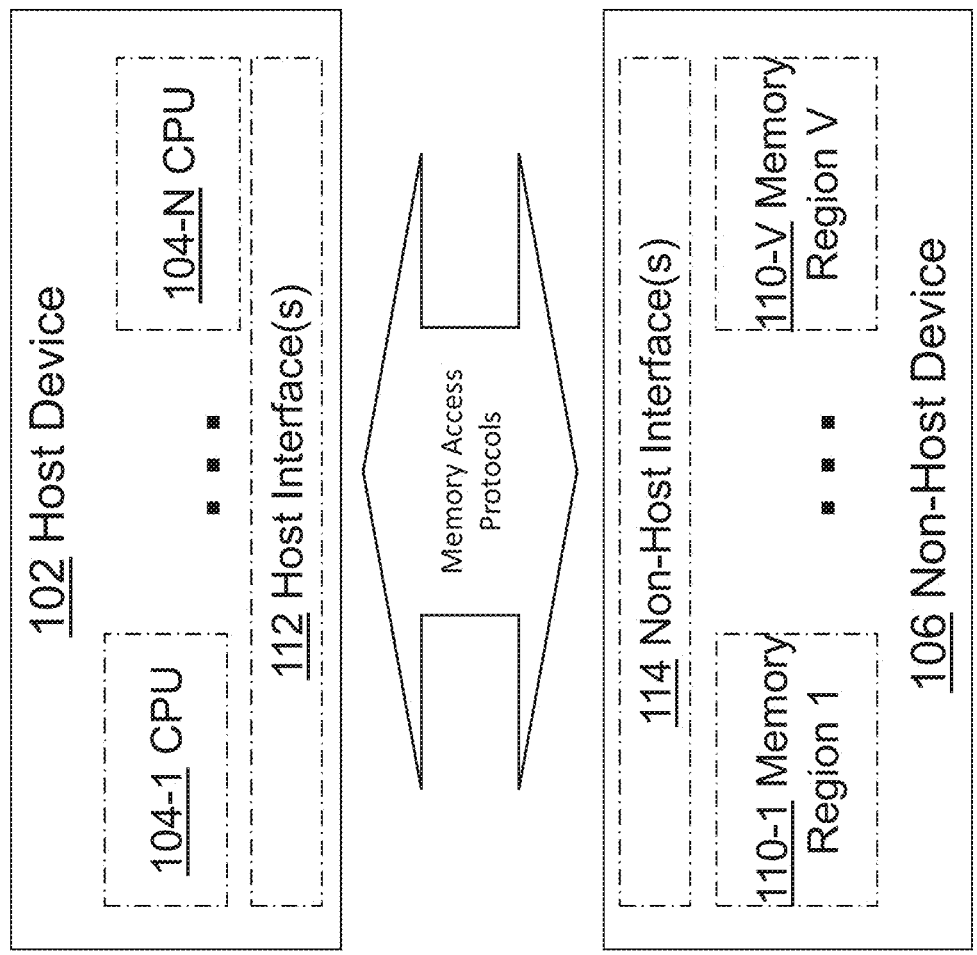
FIG. 1 illustrates an example heterogeneous computing system.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

| | |
|---|---|
| 1.0. | General Overview |
| 2.0. | Structural Overview |
| | 2.1. Host Computing Device |
| | 2.2. CPUs in the Host |
| | 2.3. Host Communication Interfaces |
| | 2.4. Non-Host Computing Device |
| | 2.5. Memory Regions |
| | 2.6. Non-Host Communication Interfaces |
| | 2.7. Miscellaneous |
| 3.0. | Functional Overview |
| | 3.1. Latency Reduction with eHPA |
| | 3.2. eHPA Extraction Logic |
| | 3.3. eHPA Extraction Operations |
| | 3.4. Memory Reads with eHPA |
| | 3.5. eHPA and Speculative Reads |
| | 3.6. Example Process Flows |
| 4.0. | Implementation Mechanism-Hardware Overview |
| 5.0. | Extensions and Alternatives |

1.0. General Overview

In a heterogenous computing system, a computing device (referred as "host computing device," "host", or "CPU") may access memory physically attached to another computing device (referred as "non-host computing device," or simply "device") using memory access protocols.

For the purpose of illustration only, cross-device memory access operations may be supported using the CXL .mem protocols. It should be noted that in various operational scenarios, cross-device memory access operations may be supported by a variety of memory access protocols including—but not necessarily limited to only—CXL .mem protocols or non-CXL protocols. One of the appeals of the CXL protocols is a relatively low latency which a CXL host computing device observes when accessing data attached to an CXL non-host computing device over CXL .mem interfaces implemented by the CXL host and non-host computing devices. The lower the memory access latency, the better the overall performance of a computing application—on behalf of which a cross-device memory access transaction is performed—running in the host computing device.

Under techniques as described herein, latency incurred in memory access protocol operations can be significantly or further reduced in cross-device memory access operations in a heterogeneous computing system. Example heterogeneous computing systems supporting cross-device memory access operations as described herein may include, but are not necessarily limited to only, any of: fixed host and non-host systems, adaptive host and non-host systems, master-slave systems, client-server systems, peer-to-peer systems, etc. Some or all of the techniques as described herein may be implemented or used to significantly reduce memory access latency in any of these varieties of systems with CXL or non-CXL protocols. More specifically, these techniques can be implemented or used to minimize FROM a first time when a first device (or a host computing device) sends a second device (or a non-host computing device) a read memory message TO a second time when the second device returns corresponding data to the first device.

The host computing device may initiate a memory access transaction to data stored in a memory entry in the memory (referred to as "device attached memory") physically attached to the non-host computing device by sending memory access protocol messages with a host physical address (HPA). The HPA received by the non-host computing device may be translated into a device physical address (DPA) corresponding to the memory entry which stores the data the host computing device intends to access.

For example, to access data in a memory entry of a memory region attached to a non-host computing device, a host computing device may issue a memory read represented by a data read request message sent by the host computing device to the non-host computing device. The data read request message may be a normative message defined or specified in accordance with an applicable industry standard specification or a proprietary specification and may contain an HPA corresponding to the memory entry to be accessed by the host computing device by way of the non-host computing device.

The non-host computing device may receive the normative message or data read request message after the message is (well) formed in accordance with syntaxes defined or specified in the applicable specification by operations performed in various layers of a receiving (Rx) protocol stack implemented with a (e.g., non-host, etc.) communication interface of the non-host computing device.

Instead of waiting for all the operations of the Rx protocol stack to complete and for the message to be well formed, an early potential HPA may be extracted (fetched/captured) by operations performed at a physical layer of the Rx protocol stack without waiting for other operations of other layers of the Rx protocol stack to start much less to complete.

The early potential HPA, which may be referred to as a physical layer extracted HPA or eHPA, can be used to prospectively perform some or all memory access operations, which would otherwise be performed after the normative message is produced by the Rx protocol stack. Valid data or any error encountered may be generated or prepared beforehand with the eHPA to speed up sending a corresponding response by the non-host computing device to the host computing device in response to the memory read or data read request message from the host computing device. As a result, latencies associated with other layers of the Rx protocol stack can be avoided or reduced.

Approaches, techniques, and mechanisms support memory access with relatively low latency. A plurality of symbols is received, from a first computing device by a second computing device, across a set of lanes of a communication link between the first computing device and the second computing device in one or more clock cycles. A physical layer extracted HPA (or eHPA) is generated from the plurality of symbols received across the set of lanes of the communication link while operations at a physical layer of a receiving (Rx) protocol stack of the second computing device are being performed. The eHPA is generated before other operations at other layers of the Rx protocol stack are performed. The eHPA is used to perform one or more operations for memory access before a normative message is formed by operations of a receiving protocol stack implemented in a communication interface of the second computing device.

In other aspects, the inventive subject matter encompasses computer apparatuses and computer-readable media configured to carry out the foregoing techniques.

2.0. Structural Overview

FIG. 1 illustrates an example heterogeneous computing system (or device) 100 in an embodiment. Heterogeneous computing system 100 comprises a host computing device 102, a non-host computing device 106, and so on. Some or all of the processing components described herein are implemented in central processing units (CPUs), application-specific integrated circuits (ASICs), field programmable gate arrays (FPGAs), microcontrollers, graphics processing units (GPUs), base boards, mother boards, add-in cards, EDSFF cards, line cards in a chassis, or other integrated circuit(s). Some or all of the processing components may include one or more memories storing instructions for implementing various components described herein, one or more hardware processors configured to execute the instructions stored in the one or more memories, and various data repositories in the one or more memories for storing data structures utilized and manipulated by the various components.

The heterogeneous computing system 100 may include more or fewer processing components than illustrated in FIG. 1. As a non-limiting example, the heterogeneous computing system 100 may include additional computing devices or processing components with which the host computing device 102, or some or all of the CPUs 104-1 through 104-N therein, operatively communicate through CXL or non-CXL communication and/or memory access interfaces and protocols.

2.1. Host Computing Device

A host computing device 102 in the heterogeneous computing system 100 may include one or more CPUs 104-1 through 104-N, where N represents an integer no less than one (1). The host computing device 102 may further include one or more (e.g., host, etc.) communication interface(s) 112; etc. In some operational scenarios, the host computing device 102 may be of a different computing device type as compared with non-host computing devices such as accelerators, memory expanders, etc.

In various operational scenarios, the host computing device 102 may include more or fewer processing components than illustrated in FIG. 1 and may be communicatively linked with additional processing components in and out of the heterogeneous computing system 100. In some operational scenarios, the host computing device 102 may be attached to or may operatively communicate with locally attached memories (e.g., dual in-line memory modules or DIMMs, etc.). The locally attached memories can be pooled among CPUs (e.g., 104-1 through 104-N, etc.) or processor cores in the host computing device 102 using memory pooling operations. Additionally, optionally or alternatively, the host computing device 102 may be attached to or may operatively communicate with some or all of: solid state drives (SSD) through Non-Volatile Memory Express (NVME) interfaces; just a bunch of GPUs (JBoG) through PCIe based communications links, riser cards, network interface cards (NICs), etc.; other host computing devices through non-transparent bridges; AI processors; just a bunch of flashes (JBoF) through memory expansion devices and/or cable extender cards with re-timers and/or transceivers; spine and/or leaf switches through NICs; etc.

2.2. CPUS in the Host

The host computing device 102 may include one or more CPUs (e.g., 104-1 through 104-N) each of which may represent a processor core that can be used to access, decode and/or execute instructions of an installed or running operating system (OS) or of various system and/or user computing processes running on top of or inside the OS. The processor core may communicate with other processing components and/or local memories and/or device attached memories to carry out operations requested or represented in the instructions. System or user data generated, processed, used or outputted by the processor core during operation may be stored, buffered, cached, read, written, updated, etc., in the memories locally attached to the host computing device 102 and/or the non-host device 106.

2.3. Host Communication Interfaces

The host computing device 102 may include one or more (e.g., host, etc.) communication interfaces 112 used by a processor core such as a CPU in the host computing device 102 to carry out memory access transactions relating to data storing, buffering, caching, reading, updating, etc., with one or more non-host computing devices such as 106 of FIG. 1. Memory access requests may be generated, communicated or made by the processor core in these memory access transactions to the non-host devices via the one or more communication interfaces 112 using memory access protocols (e.g., over PCIe, over CXL, etc.). These memory access requests may include a number of data fields such as host physical addresses (HPAs) represented in a system coherent address space of the host computing device 102.

In return, the host computing device 102 or the processor core therein can receive—through the one or more communication interfaces 112 using the memory access protocols—memory access responses in these memory access transactions from the non-host devices. These responses are responsive to the memory access request made or issued by the host computing device 102 and carry or include values for a number of data fields. These memory access responses may carry first data field values to indicate whether memory access operations requested in the memory access requests have been completed by the non-host devices successfully or unsuccessfully (or failed). Additionally, optionally or alternatively, these memory access responses received by the host computing device 102 may carry second data field values to provide or return any requested data items in host-managed device-attached memory entries referenced by some or all of the HPAs. These data entries may be read from or stored, buffered or cached at host-managed device-attached memory entries corresponding to some or all of the HPAs. Additionally, optionally or alternatively, these memory access responses may carry third data field values to indicate whether any, some or all of the provided or return data items referenced by some or all of the HPAs are poisoned (unreliable or invalid) through poison bits set to specific values or flags for these data items.

2.4. Non-Host Computing Device

A non-host computing device 106 in the heterogeneous computing system 100 may represent an accelerator, a memory expander, etc. As illustrated in FIG. 1, a non-host computing device 106 may include one or more (e.g., non-host, etc.) communication interface(s) 114 used to communicate with the host computing device 102. The non-host computing device 106 may further include or operate with, or may be attached with, a plurality of memory regions 110-1 through 110-V (which may be a part of, or alternatively separate from, the non-host computing device 106), where V represents an integer no less than one (1), that are accessible to the host computing device 102 through the memory access protocols. The plurality of memory regions may include some or all of the same types of memory regions. Additionally, optionally or alternatively, the plurality of memory regions may include different types of memory components (e.g., DIMMs, SSDs, flashes, non-volatile memory, volatile memory, etc.).

The non-host computing device 106 may include more or fewer processing components than illustrated in FIG. 1 and may be communicatively linked with additional processing components in and out of the heterogeneous computing system 100.

2.5. Memory Regions

In various embodiments, memory regions as described herein attached to a device and accessed by a different device may be configured in the heterogeneous computing system 100, for example through device provisioning and/or configuration operations.

As shown in FIG. 1, the non-host computing device 106 may include or operate with, or may be attached with, a plurality of memory regions (e.g., 110-1 through 110-V, etc.) accessible by other device(s) in the heterogeneous computing system 100 using the memory access protocols (e.g., the CXL .mem protocols, non-CXL memory access protocols, etc.).

The plurality of memory regions (e.g., 110-1 through 110-V, etc.) may be mapped to a plurality of (different, mutually exclusive) HPA ranges in a system coherent address space of another computing device such as the host computing device 102.

2.6. Non-Host Communication Interfaces

The non-host computing device 106 may include one or more (e.g., non-host, etc.) communication interfaces 114 used by a computing processor in the non-host computing device 102 to carry out memory access transactions relating to data storing, buffering, caching, reading, updating, etc., with one or more memory regions such as 110 of FIG. 1. Memory access requests may be received by the non-host computing device 106 as a part of these memory access transactions via the one or more communication interfaces 114 using the memory access protocols (e.g., over PCIe, over CXL, etc.). As noted, these memory access requests may include a number of data fields such as HPAs represented in the system coherent address space of the host computing device 102.

In response, the non-host computing device 106 may translate the HPAs into corresponding DPAs and/or access specific memory regions as well as specific memory entries as referenced or identified by the DPAs and/or error handling or logging if any of these translation or memory access operations encounters error or failure.

The non-host computing device 106 can generate and send—through the one or more communication interfaces 114 using the memory access protocols—memory access responses in these memory access transactions to the host computing device 102. These responses are responsive to the memory access request made or issued by the host computing device 102 and carry or include values for a number of data fields. These memory access responses may carry first data field values to indicate whether memory access operations requested in the memory access requests have been completed by the non-host computing device 106 successfully or unsuccessfully (or failed). Additionally, optionally or alternatively, these memory access responses sent by the non-host computing device 106 may carry second data field values to provide or return any requested data items in specific memory regions and specific memory entries therein corresponding to some or all of the HPAs. Additionally, optionally or alternatively, these memory access responses may carry third data field values to indicate whether any, some or all of the provided or return data items referenced by some or all of the HPAs are poisoned (unreliable or invalid) through poison bits set to specific values or flags for these data items.

In some operational scenarios, in response to determining that a memory access request—received by the non-host computing device 106 from the host computing device 102—cannot be successfully carried out by the non-host computing device 106, the non-host computing device 106 may refrain from sending any memory access response for the memory access request to the host computing device 102.

2.7. Miscellaneous

The foregoing figures illustrate only a few examples in which the techniques described herein may be practiced. Other embodiments may include fewer and/or additional components in varying arrangements.

3.0. Functional Overview

Figure 2:
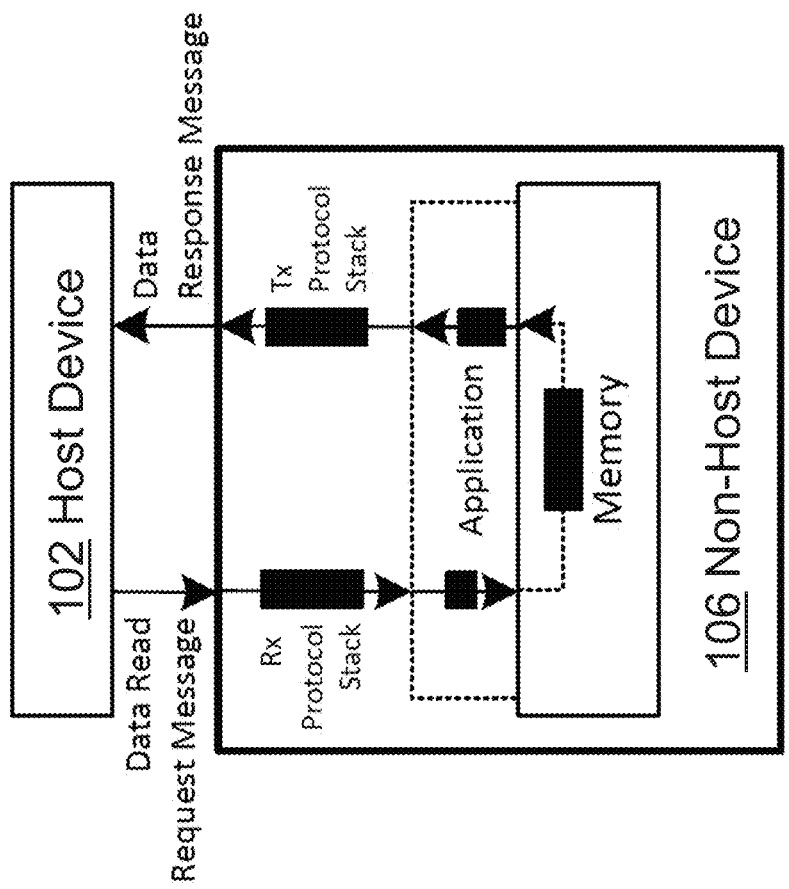
FIG. 2 illustrates example memory access operations.

FIG. 2 illustrates example memory access operations between a (e.g., CXL, non-CXL, etc.) host computing device 102 that sends a data read request message in a memory access transaction and a (e.g., CXL, non-CXL, etc.) non-host computing device 106 that returns a data response message in response.

As shown in FIG. 2, there are many operations/steps performed by the non-host computing device 106 from a first time when the data read request message starts to be received by the non-host computing device 106 to a second time when the data response message is provided by the non-host computing device.

The operations/steps between the first and second times include protocol operations/steps (denoted as "Rx protocol stack") performed by the non-host computing device 106 in accordance with an applicable (e.g., CXL, non-CXL, etc.) communication link or memory access protocol specification, for the purpose of receiving the data read request message through a communication interface 114 of FIG. 1. The Rx protocol stack implemented by the operations/steps may be (e.g., broadly, logically, etc.) divided into a number of protocol layers such as physical, link and transaction layers. Each of these protocol layers of the Rx protocol stack may be associated with its respective subset of operations/steps with its own distinctive latency.

The operations/steps between the first and second times include application processing operations/steps (denoted as "Application") performed by the non-host computing device 106. These "application" operations/steps may be performed for both message receiving (Rx) and message transmission (Tx) paths. Example application processing operations may include, but are not necessarily limited to only, some or all of: HPA to DPA translation, data encryption, memory controller queuing, quality of service, etc.

The operations/steps between the first and second times include memory access operations/steps (denoted as "Memory") performed by the non-host computing device 106. Any HPA extracted from the data read request message may be translated, for example by into a corresponding DPA. The DPA can be used by the non-host computing device 106 to access or read data stored in one or more memory entries in one or more device attached memory regions physically attached to the non-host computing device 106. In addition to latencies incurred by the memory access operations performed by the non-host computing device 106, latencies are also incurred by memory read operations performed by memory devices/components operating in conjunction with the non-host computing device 106 to carry out data read with respect to the memory entries.

The operations/steps between the first and second times include protocol operations/steps (denoted as "Tx protocol stack") performed by the non-host computing device 106 in accordance with an applicable (e.g., CXL, non-CXL, etc.) communication link or memory access protocol specification, for the purpose of transmitting the data response message through the communication interface 114 of FIG. 1. Like the Rx protocol stack, the Tx protocol stack implemented by the operations/steps may be (e.g., broadly, logically, etc.) divided into a number of protocol layers such as physical, link and transaction layers. Each of these protocol layers of the Tx protocol stack may be associated with its respective subset of operations/steps with its own distinctive latency.

3.1. Latency Reduction with EHPA

Figure 3:
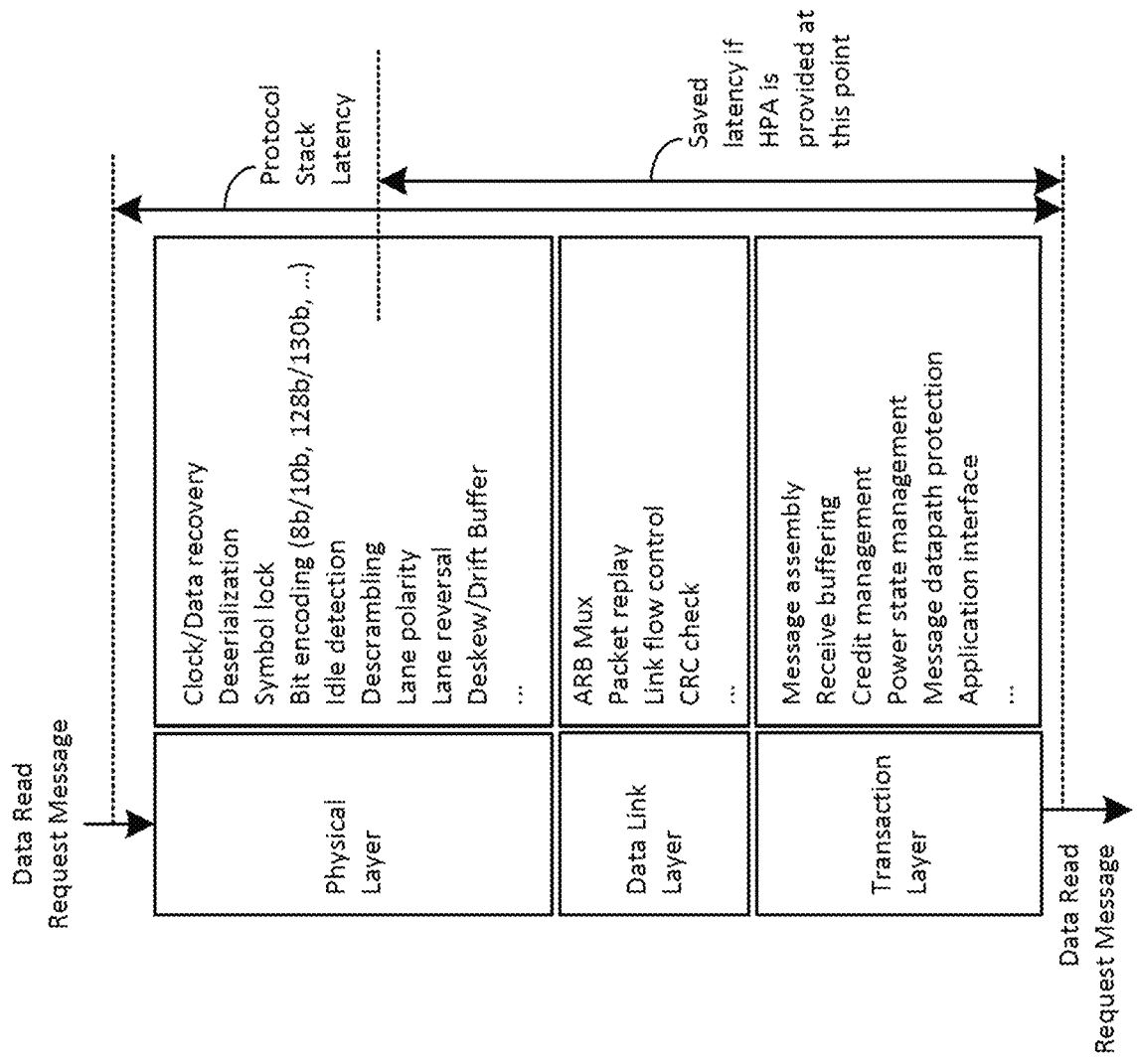
FIG. 3 illustrates example protocol layers and operations performed therein.

FIG. 3 illustrates example protocol layers of a Rx protocol stack in which a physical layer extracted HPA may be generated by physical layer operations of the non-host computing device 106 from historical and contemporaneous physical layer accumulated and produced while the data read request message from the host computing device 102 is being received by the non-host computing device 106. The physical layer extracted HPA may represent one of: a real HPA, an early potential HPA to be further validated or confirmed by additional operations, etc.

The physical layer operations refer to operations performed at the physical layer of the Rx protocol stack, and (timewise) precede other operations performed at other layers of the Rx protocol stack. Hence, the HPA can be extracted by the physical layer operations early—e.g., before the other operations of the other layers of the Rx protocol stack are performed or start to be performed. Additionally, optionally or alternatively, the HPA can be extracted by one or more earliest physical layer operations before the remaining physical layer operations and the other operations of the other layers of the Rx protocol stack are performed or start to be performed. Hence, such HPA is generated (e.g., a few nanoseconds, tens of nanoseconds, etc.) before a normative message—or the data read request message in the present example—is (well) formed by the operations of the Rx protocol stack and handed off from the Rx protocol stack to the application layer for further processing at the application layer.

As shown in FIG. 3, example physical layer operations may include, but are not necessarily limited to only, operations performed at the physical layer and related to any of: clock/data recovery, deserialization, symbol lock, bit encoding (8b/10b, 128b/130b, . . . ), idle detection, descrambling, lane polarity, lane reversal, de-skew/drift buffer, etc.

The other (non-physical layer) operations performed at the other layers of the Rx protocol stack may comprise some or all non-physical layer operations of the Rx protocol stack performed before a normative message (e.g., in compliance with the applicable specification, etc.) such as the data read request message is (well) formed and handed off to the application layer for application layer processing. These other operations may include data link layer operations, transaction layer operations, etc. Example data link layer operations may include, but are not necessarily limited to only, operations performed at the data link layer and related to any of: Arbiter/Multiplexer (ARB Mux), packet replay, link flow control, cyclic redundancy check (CRC check), etc. Example transaction layer operations may include, but are not necessarily limited to only, operations performed at the transaction layer and related to any of: message assembly, receive buffering, credit management, power state management, message data path protection, application interface, etc.

Under techniques as described herein, the physical layer extracted HPA may be handed off to the application layer as soon as it is extracted and (e.g., speculatively, etc.) processed early by the application layer operations as a potentially valid HPA before or while the normative message is (being) produced by the Rx protocol stack. As the physical layer extracted HPA is extracted by the one or more earliest physical layer operations before even the data read request message is formed, much less handed off to the application layer, latencies, which would otherwise be incurred by the remaining physical layer operations and other operations of the other layers of the Rx protocol stack as shown in FIG. 3, can be avoided or significantly reduced.

For example, as the HPA can be extracted within the physical layer, a portion of the physical layer latency and all the data link and transaction layer latencies can be saved. When a corresponding real HPA comes out of the transaction layer of the Rx protocol stack to the application layer, the now early and valid (physical layer extracted) HPA has already been or has already started to be processed by application layer operations. Additionally, optionally or alternatively, in some operational scenarios, relatively low level memory access operations performed with memory components or devices can also already be or start to be performed.

In some operational scenarios, the physical layer extracted HPA (which may also be referred to as "early HPA," "early potential HPA," or "eHPA") may represent a valid HPA, which may be validated or confirmed with a real HPA generated at the end of the Rx protocol stack with the normative message such as the data read request message in the present example.

In some operational scenarios, the physical layer extracted HPA may represent an invalid HPA, which may be invalidated by the normative message at the end of the Rx protocol stack. For example, not all messages from the host computing device 102 are data request read messages or the like. Also, not all messages from the host computing device 102 involve read memory access. Further, not all messages from the host computing device 102 involve memory access.

There is a tradeoff between reducing latency as much as possible by generating a physical layer extracted HPA as early as possible and wasted processing costs by the application layer or other attendant memory access operations triggered by the application layer operations. The sooner the physical layer extracted HPA is generated, the greater the latency reduction is, but the higher the probability of the eHPA being invalid, the higher the wasted processing costs are. In addition, a relatively high number of non-valid HPAs may incur wasted memory bandwidth and hinder other real memory access read operations with real HPAs (or non-physical layer extracted HPAs) from well-formed normative memory access messages/requests.

This is so because not all the messages transmitted between the host computing device 102 and the non-host computing device 106 are application messages. Some may be data link layer messages that contain no HPA address. Also, not all application messages are data read requests/messages. For example, there may also be write messages.

3.2. EHPA Extraction Logic

Figure 4:
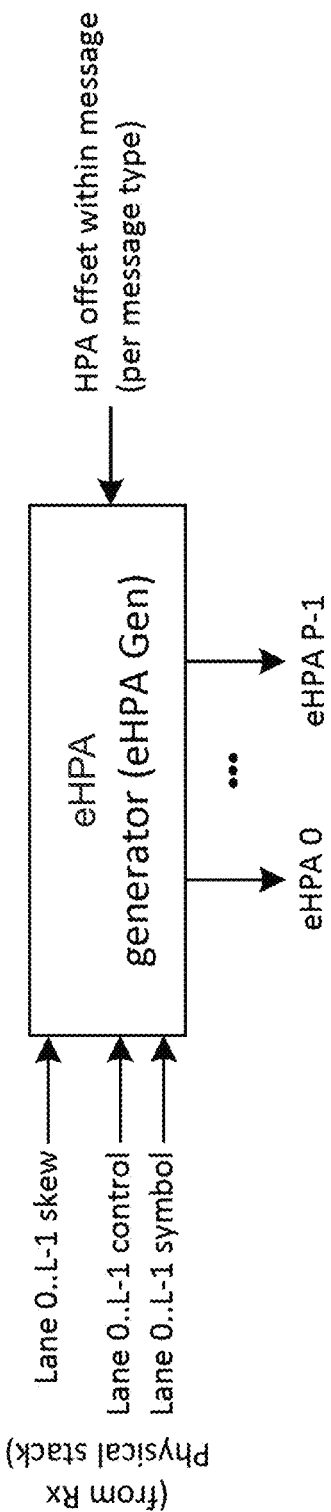
FIG. 4 illustrates example host physical address (HPA) extraction logic.

FIG. 4 illustrates example HPA extraction logic (denoted as "eHPA Gen") that may be implemented in whole or in part in hardware with a communication interface (e.g., 114 of FIG. 1, etc.) of the non-host computing device 106 over a communication link such as PCIe or CXL or non-CXL link. The communication link may include a host-to-device communication link made of up to a maximum number of lanes for example in accordance with the application communication link specification. These lanes of the host-to-device communication link are for the host computing device 102 to transmit bytes of various messages and for the non-host computing device 106 to receive the bytes of these messages. The total number of lanes of the host-to-device communication link is L, where L is a positive integer such as four (4), eight (8), etc.

As shown in FIG. 4, the HPA extraction logic ("eHPA Gen") implemented with the physical layer of the Rx protocol stack taps on, or is operationally or communicatively connected with, the lanes to access symbols or bytes carried on each of the lanes (from Lane 0 to Lane L-1).

The HPA extraction logic ("eHPA Gen") is configured or implemented to receive control data that indicates when or on which of the lanes (from Lane 0 to Lane L-1) the first byte of a host-originated message appears and to receive skew data on each of the lanes (from Lane 0 to Lane L-1). In many if not all operational scenarios, all these data such as the symbols/bytes, control data, skew data, etc., are (e.g., already, readily, etc.) available as part of the physical layer operations performed in the Rx protocol stack. Example control data as described herein may include, but is not necessarily limited to only, information relating to any of: whether a message has already started on the communication link, which lane is carrying the first byte of a message, etc.

The HPA extraction logic ("eHPA Gen") may also be configured or implemented to access or receive an HPA offset within the host-originated message. The HPA offset refers to a (relative) byte position in the host-originated message, relative to the (very) first byte of the message.

In some operational scenarios, in which the communication link is a CXL communication or memory access link as specified in the CXL specification (e.g., version 2.0, version 3.0, etc.), an HPA in a data memory read message (or data read request message) is set to a fixed offset within the message regardless of types of memory read commands or transactions. Hence, only a single HPA offset may be configured for the HPA extraction logic ("eHPA Gen"). In these operational scenarios, the HPA extraction logic ("eHPA Gen") may be configured or implemented to access and apply the fixed HPA offset to generate a physical layer extracted HPA (e.g., eHPA0, . . . eHPA P-1, where P is an integer no less than one (1), etc.) for a host-originated message from the symbols/bytes, control data and skew data collected at the physical layer before the incoming message is well formed after one or more non-physical layers (e.g., data link layer, transaction layer, etc.).

In some operational scenarios, an HPA in a data memory read message (or data read request message) is not set to a fixed offset within the message. More than one HPA offset may be specified, configured or supported with the HPA extraction logic ("eHPA Gen"). For example, different HPA offsets may be specified, configured or supported with the HPA extraction logic ("eHPA Gen") for different types of data read messages or transactions. In these operational scenarios, the HPA extraction logic ("eHPA Gen") may be configured or implemented to decode a specific message type for an incoming message based on the symbols/bytes, control data and skew data, as well as to access and apply an applicable HPA offset for the specific message type to generate a corresponding physical layer extracted HPA (e.g., eHPA0, . . . eHPA P-1, where P is an integer no less than one (1), etc.) from the symbols/bytes, control data and skew data collected at the physical layer before the incoming message is well formed after one or more non-physical layers (e.g., data link layer, transaction layer, etc.).

The HPA extraction logic ("eHPA Gen") of FIG. 4 can be configured or implemented to access or have unscrambled symbols/bytes available from each of the lanes that constitute the host-to-device communication link. Physical layer extracted HPAs may be generated from the unscrambled symbols/bytes, even when host-originated messages are scrambled when transmitted by the host computing device 102. De-scrambling operations may be performed by the non-host computing device 106 at the physical layer of the Rx protocol stack to produce the unscrambled symbols/bytes from the host-originated scrambled messages.

3.3. EHPA Extraction Operations

FIG. 5A illustrates an example (timewise) sequence of messages (or message sequence). The message sequence may include two messages: message 0 of type X, and message 1 of type Y. For the purpose of illustration only, each of these messages comprises eight (8) bytes in length, and the communication link for delivering these messages to the non-host computing device 106 comprises four (4) lanes. These messages or bytes therein are striped across the lanes that compose the communication link at the symbol/byte level. Message 0 has its HPA in bytes B and C, for example as dictated by an applicable message type X format, whereas message 1 has its HPA in bytes D and E, for example as dictated by an applicable message type Y format.

Figure 5C:
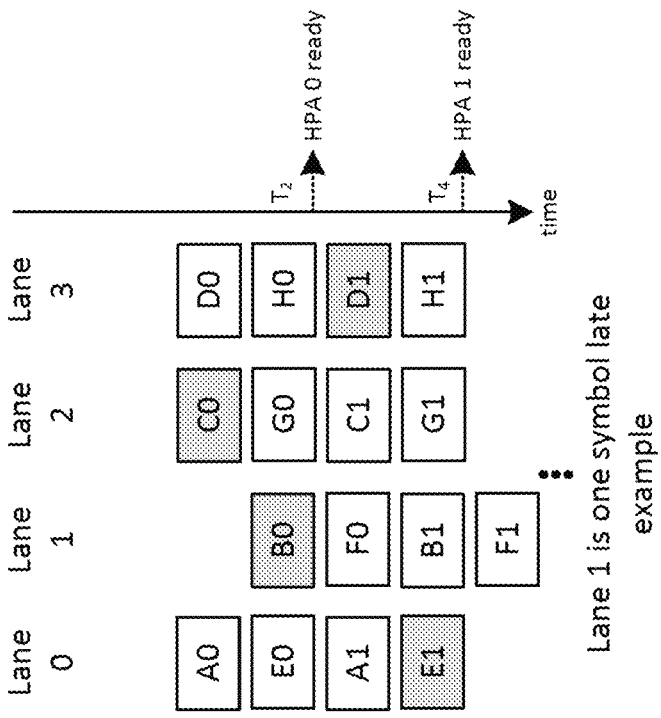
Figure 5D:
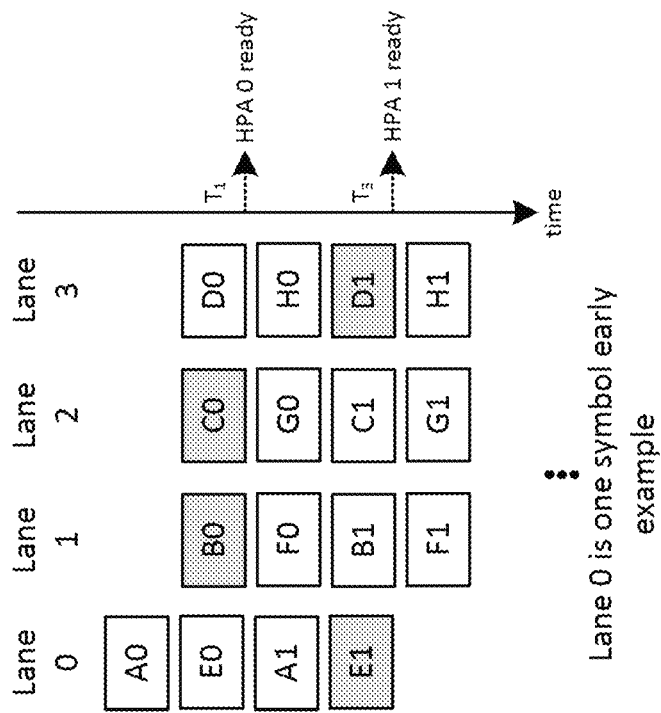

FIG. 5B through FIG. 5D illustrate example physical layer HPA extraction operations that may be performed by the HPA extraction logic ("eHPA Gen") implemented with the physical layer of the Rx protocol stack. For the purpose of illustration only, the first byte of a message may be assigned to lane 0. It should be noted, however, that in various embodiments the first byte of a message may or may not be assigned to lane 0.

As shown in FIG. 5B, the bytes of the messages of FIG. 5A arrive at the non-host computing device in a case in which there is no skew across the lanes. Hence, the bytes in each lane arrive at the non-host computing device at or in the same relative time that the host computing device has sent these bytes, excluding a common transmission time or the same transmission delay/latency between the host computing device and the non-host computing device. Under this no skew case, The HPA in message 0, HPA 0, can be extracted at time T1, even before symbols/bytes of message 0 are received in the four lanes. In comparison, the HPA in message 1, HPA 1, can be extracted at time T4, when all symbols/bytes of message 1 are received in the four lanes.

The time when an HPA can be extracted relative to receiving bytes/symbols of a message depends on where the HPA is inside the message and how many lanes the communication link has. The sooner the HPA arrives and/or the lower the number of lanes exists in the link, the higher the latency savings from the time the HPA is extracted to the end of the message is received, and hence the higher the latency savings achieved within the Rx protocol stack.

Skews across the lanes may play a role in extracting HPA at the physical layer. As shown in FIG. 5C, in a case in which Lane 0 is one symbol/byte worth of data ahead of the rest of the lanes, the HPA of message 1, HPA 1, can be extracted one cycle—which refers the time it takes one byte of data to be transmitted on a lane with all overheads in accordance with the applicable communication link or memory access protocol—earlier, or in T3. In comparison, as shown in FIG. 5D, in a case in which Lane 1 is delayed by one symbol with respect to the rest of the lanes, the HPA of message 0, HPA 0, can be extracted one cycle later than in the zero-skew case of FIG. 5B until T2.

The skews at any given time across the lanes may be accessed or made available to the HPA extraction logic ("eHPA Gen") as the physical layer is typically tasked to perform de-skew operations to align symbols/bytes of the lanes—so that after these operations there are no skews across the lanes. This de-skew operation involves detecting specific markers in each of the lanes, buffering all the lanes until the marker of the latest lane is detected, and then releasing from that time point all the lanes for further operations within the physical layer and for subsequent data link and transaction layer operations of the Rx protocol stack.

For the purpose of illustration only, it has been described in FIG. 5A through FIG. 5D that messages have their respective valid HPAs. As mentioned, this may or may not be true in all operational scenarios. For instance, in some operational scenarios, a message 1 may be (e.g., CXL, non-CXL, PCIe, etc.) link layer protocol message that has no HPA. Any physical layer extracted HPA with respect to such a message may render an invalid HPA that does not correspond to any (application memory) data read request message.

3.4. Memory Reads with Ehpa

Figure 6A:
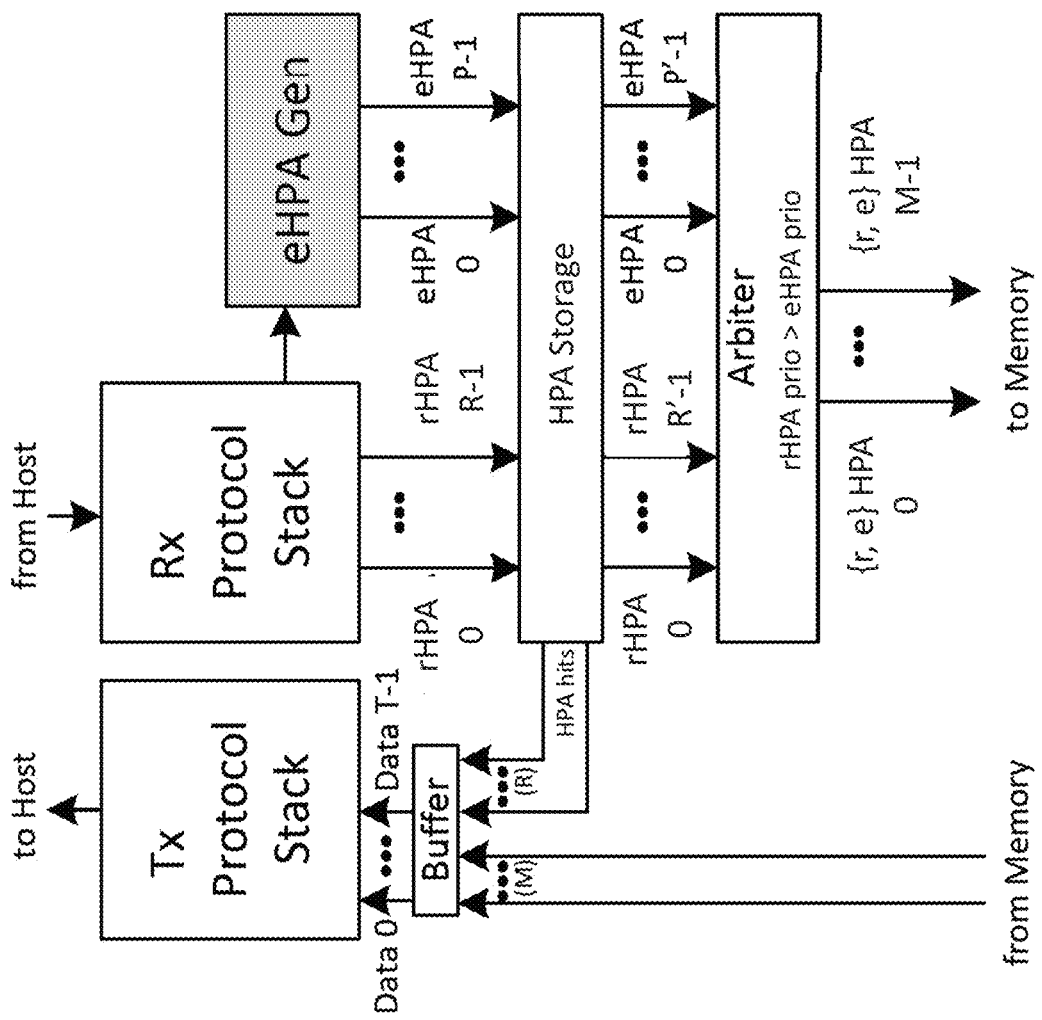
FIG. 6A and FIG. 6B illustrate example memory read operations with physical layer extracted HPAs.

FIG. 6A illustrates example memory read operations with eHPAs extracted in the physical layer of the Rx protocol. For the purpose of illustration, up to a total number (denoted as P, where P is an integer no less than one (1)) of eHPAs (e.g., eHPA 0 through eHPA P-1) are extracted by the HPA extraction logic ("eHPA Gen") per cycle in reference to a clock source of the non-host computing device 106. Up to a total number (denoted as R, where R is an integer no less than one (1)) of real memory read HPAs (denoted as rHPAs; HPA 0 through HPA R-1) are received or generated from the Rx protocol stack per cycle. The real memory read HPAs, or simply HPAs, are received or generated after data read request messages that specify these rHPAs have been well formed or generated by the Rx protocol stack.

The values of P and R representing the total numbers of eHPAs and rHPAs may depend on a clock frequency ratio between the Rx Protocol Stack and the application layer. For each rHPA, a corresponding eHPA can be extracted earlier in the physical layer. There may be more eHPAs extracted in the physical layer than rHPAs at the end of the Rx protocol stack, as some eHPAs may possibly turn out to be invalid and have no corresponding rHPAs. For example, a valid data read request message may not be formed or produced by the Rx protocol stack even if an eHPA has been extracted in the physical layer. In some operational scenarios, P=R=1.

In response to receiving an (e.g., newly available, etc.) eHPA generated by the HPA extraction logic ("eHPA Gen") in the physical layer, the eHPA may be cached or enqueued in an HPA storage.

In response to receiving an (e.g., newly available, etc.) rHPA generated by the Rx protocol stack, the non-computing device 106 or the application layer therein may determine whether an HPA (e.g., an eHPA, etc.) corresponding to the received rHPA already exists in the HPA storage.

In response to determining that such an HPA exists (or a HPA cache hit occurs) in the HPA storage, the non-host computing device 106 may access data for the HPA in a (e.g., transmit, cache, memory, etc.) buffer associated with the Tx protocol stack implemented by the non-computing device 106 in a communication interface 114, and return the data (e.g., any of Data 0 through Data T-1, etc.) from the buffer to the host computing device 102. In an example, the data in the buffer may represent valid data previously retrieved by previous lookahead memory access operations with a previously received HPA (e.g., an eHPA, etc.) equaling to the present received rHPA from a memory entry corresponding to the rHPA. In another example, the data in the buffer may indicate an error encountered in previous lookahead memory access operations with a previously received HPA equaling to the present received rHPA. This can significantly reduce latency as some or all of lookahead memory access operations requested by the data read request message have already been completed at this point at the non-host computing device 106.

On the other hand, in response to determining that the received rHPA does not exist (or a HPA cache miss occurs) in the HPA storage, the non-host computing device 106 may cache or enqueue the received rHPA in the HPA storage or directly pass the received rHPA to an (memory read channel) arbiter used to select, service or dequeue HPAs—{r, e}HPA—in the HPA storage for memory read operations performed over a set of memory read channels to memory regions attached to the non-host computing device.

The arbiter may implement a priority based queuing operation. At a given time or cycle, the arbiter may dequeue up to a maximum or configured number of HPAs with the highest priorities from the HPA queue based at least in part on priorities configured for rHPAs and/or eHPAs in the HPA queue. In some operational scenarios, in the HPA queue associated with the HPA storage, priorities for rHPAs may be configured with relatively high priorities, whereas priorities for eHPAs may be configured with lower priorities.

For the purpose of illustration only, at a given time or cycle, HPAs waiting for the arbiter to dequeue from the HPA storage may include a set of rHPAs such as rHPA 0 through rHPA R'-1 as well as a set of eHPAs such as eHPA 0 through eHPA P'-1. The set of eHPAs may include, or may be selected from, eHPAs for which lookahead data read operations have yet to be performed.

The arbiter may dequeue a total number (denoted as M; where M is an integer no less than one (1)) of rHPAs and/or eHPAs (which may be collectively denoted as "{r, e}HPA"; {r, e}HPA 0 through {r, e}HPA M-1).

Each of the dequeued {r, e}HPAs can be translated into a corresponding {r, e}DPAs. The DPA can be used to access a specific memory region attached to the non-host computing device as well as a specific memory entry as referenced or identified by the DPA.

If valid data is found with the specific memory entry corresponding to the dequeued HPA, then the data is buffered, cached or temporally stored in the buffer associated with the Tx protocol stack.

On the other hand, if any of these translation or memory access operations encounters error or failure for the dequeued HPA, then a corresponding error may be logged or indicated for the dequeued HPA in the buffer associated with the Tx protocol stack.

It should be noted that the non-host computing device returns data, for an HPA, stored or cached in the buffer associated with the Tx protocol stack to the host computing device only in response to receiving an rHPA (equaling to the HPA) from the Rx protocol stack. In other words, the non-host computing device may not return data, for an HPA, stored or cached in the buffer associated with the Tx protocol stack to the host computing device unless the rHPA (equaling to the HPA) is received from the Rx protocol stack.

In some operational scenarios, if an HPA hit with a received rHPA occurs, and if data for the HPA is not yet in the buffer associated with the Tx protocol stack, which means that a data read operation for the HPA is in progress, then the non-host computing device may place the data request represented by the received rHPA in a wait state while memory access operations for the HPA is continuing. When the outstanding data or any error arrives at the buffer, the non-host computing device 106 may move the data request out of the wait state and send the data or error to the host computing device 102.

If a newly extracted eHPA is found already existing in the HPA storage, then nothing needs to be done—the newly extracted eHPA may be simply ignored.

The arbiter can dequeue received HPAs representing real or possible data requests and prioritize up to a specific number of HPAs with the highest priorities into available read channels (e.g., M channels, etc.) to access corresponding memory entries in the device attached memory of the non-host computing device 106.

3.5. EHPA and Speculative Reads

Some memory access protocols such as CXL .mem protocols support speculative memory reads. A memory speculative read message can be sent by a host computing device (e.g., 102 of FIG. 1, etc.) to a non-host computing device (e.g., 106 of FIG. 1, etc.) to start a memory access at the non-host computing device before the host computing device 102 has completed preparation or coherence operations at the host computing device 102 in order to reduce access latency. A speculative memory read may not be represented with a message as complete as a message representing a (real; non-speculative) memory read. Nevertheless, both speculative and non-speculative memory reads are represented by formative messages generated after completing operations at all layers of a Rx protocol stack at the non-host computing device 106.

Lookahead operations performed or enabled with physical layer extracted HPAs as described herein can be implemented in a heterogenous computing system that supports real or non-speculative memory reads only or that supports both real and speculative memory reads.

Figure 6B:
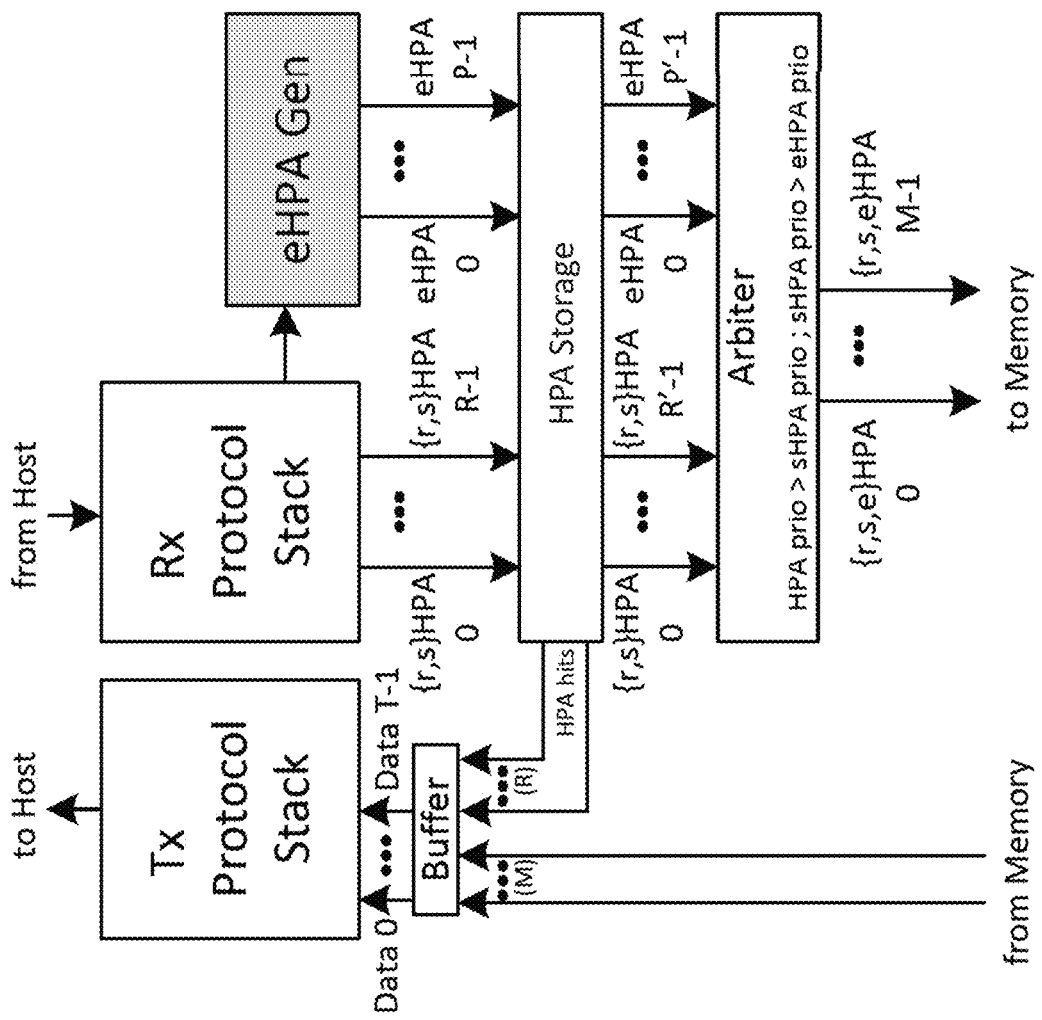

FIG. 6B illustrates example memory read operations with eHPAs extracted in the physical layer of the Rx protocol in a heterogeneous computing system (e.g., 100 of FIG. 1, etc.). For the purpose of illustration, up to a total number (denoted as P, where P is an integer no less than one (1)) of eHPAs (e.g., eHPA 0 through eHPA P-1) are extracted by the HPA extraction logic ("eHPA Gen") per cycle in reference to a clock source of the non-host computing device 106. Up to a total number (denoted as R, where R is an integer no less than one (1)) of real and/or speculative memory read HPAs (denoted as {r, s}HPAs; HPA 0 through HPA R-1) are received or generated from the Rx protocol stack per cycle. The real and/or speculative memory read HPAs, or simply HPAs, are received or generated after non-speculative or speculative data read request messages that specify these {r, s}HPAs have been well formed or generated by the Rx protocol stack.

The values of P and R representing the total numbers of eHPAs and {r, s}HPAs may depend on a clock frequency ratio between the Rx Protocol Stack and the application layer. For each {r, s}HPA, a corresponding eHPA can be extracted earlier in the physical layer. There may be more eHPAs extracted in the physical layer than {r, s}HPAs at the end of the Rx protocol stack, as some eHPAs may possibly turn out to be invalid and have no corresponding {r, s}HPAs. In some operational scenarios, P=R=1.

In response to receiving an (e.g., newly available, etc.) eHPA generated by the HPA extraction logic ("eHPA Gen") in the physical layer, the eHPA may be cached or enqueued in an HPA storage. In some operational scenarios, the HPA storage may utilize the same speculative HPA storage if the latter is available at the non-host computing device 106.

In response to receiving an (e.g., newly available, etc.) rHPA generated by the Rx protocol stack, the non-host computing device 106 or the application layer therein may determine whether an HPA (e.g., an eHPA or sHPA, etc.) corresponding to the received rHPA already exists in the HPA storage.

In response to determining that such an HPA exists (or a HPA cache hit occurs) in the HPA storage, the non-host computing device 106 may access data for the HPA in a (e.g., transmit, cache, memory, etc.) buffer associated with the Tx protocol stack implemented by the non-computing device 106 in a communication interface 114, and return the data (e.g., any of Data 0 through Data T-1, etc.) from the buffer to the host computing device 102. In an example, the data in the buffer may represent valid data previously retrieved by previous lookahead memory access operations with a previously received HPA (e.g., an eHPA or sHPA, etc.) equaling to the present received rHPA from a memory entry corresponding to the rHPA. In another example, the data in the buffer may indicate an error encountered in previous lookahead memory access operations with a previously received HPA equaling to the present received rHPA. This can significantly reduce latency as some or all of lookahead memory access operations requested by the data read request message have already been completed at this point at the non-host computing device 106.

On the other hand, in response to determining that the received rHPA does not exist (or a HPA cache miss occurs) in the HPA storage, the non-host computing device 106 may cache or enqueue the received rHPA in the HPA storage or directly pass the received rHPA to an arbiter used to select, service or dequeue HPAs—{r, e}HPA—in the HPA storage for memory read operations.

In response to receiving an (e.g., newly available, etc.) sHPA generated by the Rx protocol stack, the non-computing device 106 or the application layer therein may determine whether an HPA (e.g., an eHPA, etc.) corresponding to the received sHPA already exists in the HPA storage.

In response to determining that such an HPA exists (or a HPA cache hit occurs) in the HPA storage, the non-host computing device 106 may send to the host computing device 102 a speculative data read response message in response to the speculative data read request message. The speculative data read response message informs the host computing device 102 of lookahead memory access operations already started on the non-host computing device 106. This can significantly reduce latency as some or all of lookahead memory access operations requested by the speculative data read request message have already been completed at this point at the non-host computing device 106.

On the other hand, in response to determining that the received sHPA does not exist (or a HPA cache miss occurs) in the HPA storage, the non-host computing device 106 may cache or enqueue the received sHPA in the HPA storage or directly pass the received sHPA to the arbiter.

The arbiter may implement a priority based queuing operation. At a given time or cycle, the arbiter may dequeue up to a maximum or configured number of HPAs with the highest priorities from the HPA queue based at least in part on priorities configured for {r, s}HPAs and/or eHPAs in the HPA queue. In some operational scenarios, in the HPA queue associated with the HPA storage, rHPAs may be configured the highest priorities; eHPAs may be configured the lowest priorities; and sHPAs may be configured intermediate priorities between the highest and lowest priorities. Hence, the rHPAs can be dequeued for memory access operations before the eHPAs and sHPAs; the sHPAs can be dequeued for memory access operations before the eHPAs.

For the purpose of illustration only, at a given time or cycle, HPAs waiting for the arbiter to dequeue from the HPA storage may include a set of {r, s}HPAs such as {r, s}HPA 0 through {r, s}HPA R'-1 as well as a set of eHPAs such as eHPA 0 through eHPA P'-1. The set of {r, s}HPAs may include rHPAs for which cached data for memory entries corresponding to these rHPAs are not found in the HPA storage. In other words, cache misses occur for these rHPAs. The set of {r, s}HPAs may also include, or may be selected from, sHPAs for which lookahead data read operations have yet to be performed. The set of eHPAs may include, or may be selected from, eHPAs for which lookahead data read operations have yet to be performed.

The arbiter may dequeue a total number (denoted as M; where M is an integer no less than one (1)) of rHPAs and/or sHPAs and/or eHPAs—which may be collectively denoted as "{r, s, e}HPA"; {r, s, e}HPA 0 through {r, s, e}HPA M-1.

Each of the dequeued {r, s, e}HPAs can be translated into a corresponding {r, s, e}DPAs. The DPA can be used to access a specific memory region attached to the non-host computing device as well as a specific memory entry as referenced or identified by the DPA.

If valid data is found with the specific memory entry corresponding to the dequeued HPA, then the data is buffered, cached or temporally stored in the buffer associated with the Tx protocol stack. In some operational scenarios, if the data is for a real read request and the buffer is empty, then there is no need to buffer the data retrieved from the specific memory entry, which can be directly sent to the host without being buffered. In some other operational scenarios, if the data is for a real read request and the buffer is empty, the data retrieved from the specific memory entry is buffered. In these other operational scenarios, data communication from the device to the host may be flow controlled from the host, for example through I/F signals on the TX protocol stack of the non-host computing device or by other (e.g., standard, available, etc.) means like credit-based flow control.

On the other hand, if any of these translation or memory access operations encounters error or failure for the dequeued HPA, then a corresponding error may be logged or indicated for the dequeued HPA in the buffer associated with the Tx protocol stack.

It should be noted that the non-host computing device returns data, for an HPA, stored or cached in the buffer associated with the Tx protocol stack to the host computing device only in response to receiving an rHPA (equaling to the HPA) from the Rx protocol stack. In other words, the non-host computing device may not return data, for an HPA, stored or cached in the buffer associated with the Tx protocol stack to the host computing device unless the rHPA (equaling to the HPA) is received from the Rx protocol stack.

In some operational scenarios, if an HPA hit with a received rHPA occurs, and if data for the HPA is not yet in the buffer associated with the Tx protocol stack, which means that a data read operation for the HPA is in progress, then the non-host computing device may place the non-speculative data request represented by the received rHPA in a wait state while memory access operations for the HPA is continuing. When the outstanding data or any error arrives at the buffer, the non-host computing device 106 may move the data request out of the wait state and send the data or error to the host computing device 102.

If a newly extracted eHPA is found already existing in the HPA storage, then nothing needs to be done—the newly extracted eHPA may be simply ignored.

In some operational scenarios, misses in the HPA storage by any type of HPA proceed, or cause any missed HPAs to be sent to the arbiter. The arbiter can dequeue received HPAs representing real or possible data requests and prioritize up to a specific number of HPAs with the highest priorities into available read channels (e.g., M channels, etc.) to access corresponding memory entries in the device attached memory of the non-host computing device 106.

For the purpose of illustration only, it has been described that a communication link as described herein may be a CXL communication link implementing the CXL protocols. It should be noted that, in various embodiments, some or all techniques as described herein may be implemented or performed for CXL communication links as well as for non-CXL communication links implementing non-CXL protocols. These non-CXL communication links may include, but are not necessarily limited to only, any of: PCIe, CCIX, GenZ, OpenCAPI, etc.

In some operational scenarios, the non-host computing device can implement a specific configuration mode in which a subset of operations relating to the overall data request processing may be performed for an eHPA while remaining operations relating to the overall data request processing may be held up until a later time point at which it is determined that a corresponding rHPA has been received or provided by the host computing device 102 through the Rx protocol stack. This approach may increase latency but may significantly reduce wasting memory bandwidth for non-valid or non-materialized eHPAs extracted from the physical layer of the Rx protocol stack.

Additionally, optionally or alternatively, the non-host computing device 106 may implement a timeout mechanism to discard any non-valid eHPAs in the HPA storage after a specific lapse of time has happened. For example, in some operational scenarios, for each message, an eHPA may be extracted. However, some extracted eHPAs may be bogus or not related to any speculative or non-speculative data read requests. While eHPAs in an HPA storage that match with non-speculative HPAs can be removed from the HPA storage in response to determining that such hits occur, the bogus eHPAs may linger in the HPA storage. In some operational scenarios, eHPAs live beyond a configured time-to-live value may be removed from the HPA storage.

In some operational scenarios, the HPA extraction logic ("eHPA Gen") may be disabled until the communication link between the host computing device 102 and the non-host computing device 106 reaches a state in which the host computing device 102 can send memory read messages or data read request messages. While the communication link is being trained or in a process of being brought up, as the host computing device cannot send or initiate memory read transactions, no valid HPAs may exist. Once the communication reaches the state in which the host computing device 102 can send memory read messages or data read request messages, the HPA extraction logic ("eHPA Gen") may be enabled to extract HPAs in the physical layer of the Rx protocol stack.

3.6. Example Process Flows

FIG. 7 illustrates an example process flow, according to an embodiment. The various elements of the flow described below may be performed with one or more computing devices (e.g., memory accelerator, non-host computing device, host computing device, a computing device in a peer-to-peer system, a computing device in a host-to-device system, a computing device in a heterogeneous computing system, etc.).

Block 702 comprises receiving, from a first computing device by a second computing device, a plurality of symbols across a set of lanes of a communication link between the first computing device and the second computing device in one or more clock cycles.

Block 704 comprises generating a physical layer extracted host physical address (eHPA) from the plurality of symbols received across the set of lanes of the communication link while performing operations at a physical layer of a receiving (Rx) protocol stack of the second computing device. The eHPA is generated before other operations at other layers of the Rx protocol stack are performed.

Block 706 comprises using the eHPA to perform one or more operations for memory access before a normative message is formed by operations of a receiving protocol stack implemented in a communication interface of the second computing device.

In an embodiment, the communication link is implemented with communication protocol operations in accordance with an applicable communication link specification; the normative message is made of data fields represented by syntax elements of the applicable communication link specification.

In an embodiment, the communication link represents one of: a Compute Express Link (CXL), or a non-CXL communication link.

In an embodiment, the one or more operations for memory access include an address translation operation that translates the eHPA into a device physical address (DPA); the DPA references a memory entry in a memory region attached to the second computing device.

In an embodiment, the one or more operations for memory access include a memory read operation that reads valid data from a memory entry in a memory region attached to the second computing device; the one or more operations for memory access include a buffering operation that buffers the valid data from the memory entry in a buffer associated with a transmitting (Tx) protocol stack of the second computing device.

In an embodiment, the generated eHPA is cached in a host physical address (HPA) storage at a first time; valid data read from a memory entry corresponding to the eHPA is cached in a buffer associated with a transmitting (Tx) protocol stack of the second computing device at a second time later than the first time; a data read request message is generated by the Rx protocol stack at a third time later than the second time; the buffered valid data is sent by the second computing device to the first computing device in response to determining that an HPA specified in the data read request message matches the eHPA cached in the HPA storage.

In an embodiment, the generated eHPA is cached in a host physical address (HPA) storage at a first time; a data read request message is generated by the Rx protocol stack at a second time, later than the first time, while valid data is being read from a memory entry corresponding to the eHPA; the valid data is sent by the second computing device to the first computing device, in response to determining that an HPA specified in the data read request message matches the eHPA cached in the HPA storage and that the valid data has been successfully read from the memory entry.

In an embodiment, the plurality of symbols pertains to one of: a data read request message or a speculative data read request message.

In an embodiment, the eHPA is generated based at least in part on real time skew information relating to the set of lanes in the communication link.

In an embodiment, a computing device such as a server, one or more computing processors or chips or chipsets on a server board, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

4.0. Implementation Mechanism-Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 8:
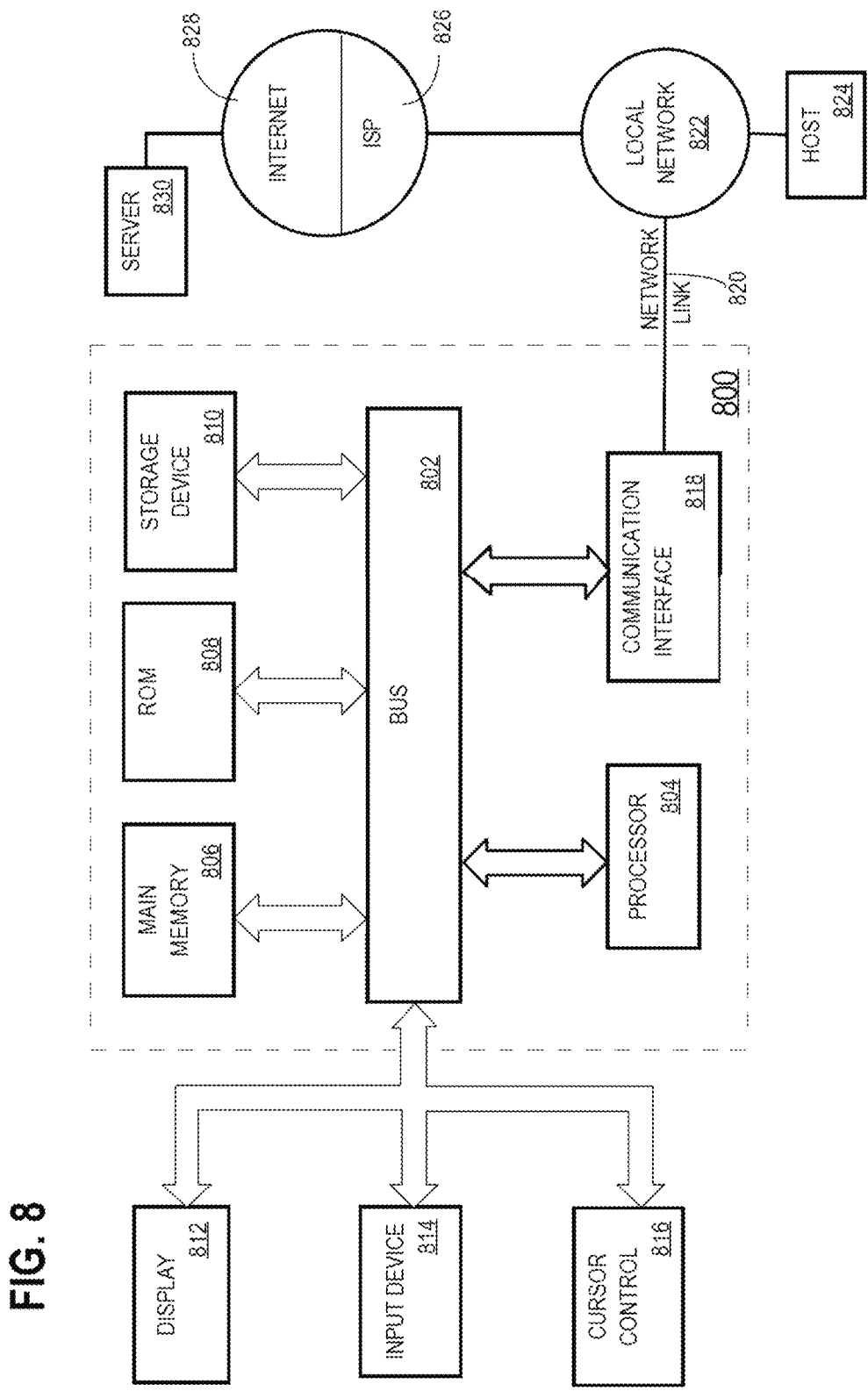
FIG. 8 is block diagram of a computer system upon which embodiments of the inventive subject matter may be implemented.

FIG. 8 is a block diagram that illustrates an example computer system 1300 that may be utilized in implementing the above-described techniques, according to an embodiment. Computer system 1300 may be, for example, a desktop computing device, laptop computing device, tablet, smartphone, server appliance, computing mainframe, multimedia device, handheld device, networking apparatus, or any other suitable device. In an embodiment, FIG. 8 constitutes a different view of the devices and systems described in previous sections.

Computer system 800 may include one or more ASICs, FPGAs, or other specialized circuitry 803 for implementing program logic as described herein. For example, circuitry 803 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 800 may include one or more hardware processors 804 configured to execute software-based instructions. Computer system 800 may also include one or more busses 802 or other communication mechanism for communicating information. Busses 802 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 800 also includes one or more memories 806, such as a RAM, hardware registers, or other dynamic or volatile storage device for storing data units to be processed by the one or more ASICs, FPGAs, or other specialized circuitry 803. Memory 806 may also or instead be used for storing information and instructions to be executed by processor 804. Memory 806 may be directly connected or embedded within circuitry 803 or a processor 804. Or, memory 806 may be coupled to and accessed via bus 802. Memory 806 also may be used for storing temporary variables, data units describing rules or policies, or other intermediate information during execution of program logic or instructions.

Computer system 800 further includes one or more read only memories (ROM) 808 or other static storage devices coupled to bus 802 for storing static information and instructions for processor 804. One or more storage devices 810, such as a solid-state drive (SSD), magnetic disk, optical disk, or other suitable non-volatile storage device, may optionally be provided and coupled to bus 802 for storing information and instructions.

A computer system 800 may also include, in an embodiment, one or more communication interfaces 818 coupled to bus 802. A communication interface 818 provides a data communication coupling, typically two-way, to a network link 820 that is connected to a local network 822. For example, a communication interface 818 may be an integrated services digital network (ISDN) card, cable modem, satellite modem, or a modem to provide a data communication connection to a corresponding type of telephone line. As another example, the one or more communication interfaces 818 may include a local area network (LAN) card to provide a data communication connection to a compatible LAN. As yet another example, the one or more communication interfaces 818 may include a wireless network interface controller, such as an 802.11-based controller, Bluetooth controller, Long Term Evolution (LTE) modem, and/or other types of wireless interfaces. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by a Service Provider 826. Service Provider 826, which may for example be an Internet Service Provider (ISP), in turn provides data communication services through a wide area network, such as the world-wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

In an embodiment, computer system 800 can send and receive data units through the network(s), network link 820, and communication interface 818. In some embodiments, this data may be data units that the computer system 800 has been asked to process and, if necessary, redirect to other computer systems via a suitable network link 820. In other embodiments, this data may be instructions for implementing various processes related to the described techniques. For instance, in the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution. As another example, information received via a network link 820 may be interpreted and/or processed by a software component of the computer system 800, such as a web browser, application, or server, which in turn issues instructions based thereon to a processor 804, possibly via an operating system and/or other intermediate layers of software components.

Computer system 800 may optionally be coupled via bus 802 to one or more displays 812 for presenting information to a computer user. For instance, computer system 800 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 812 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 812.

One or more input devices 814 are optionally coupled to bus 802 for communicating information and command selections to processor 804. One example of an input device 814 is a keyboard, including alphanumeric and other keys. Another type of user input device 814 is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. Yet other examples of suitable input devices 814 include a touch-screen panel affixed to a display 812, cameras, microphones, accelerometers, motion detectors, and/or other sensors. In an embodiment, a network-based input device 814 may be utilized. In such an embodiment, user input and/or other information or commands may be relayed via routers and/or switches on a Local Area Network (LAN) or other suitable shared network, or via a peer-to-peer network, from the input device 814 to a network link 820 on the computer system 800.

As discussed, computer system 800 may implement techniques described herein using customized hard-wired logic, one or more ASICs or FPGAs 803, firmware and/or program logic, which in combination with the computer system causes or programs computer system 800 to be a special-purpose machine. According to one embodiment, however, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 800 can receive the data on the network and demodulate the signal to decode the transmitted instructions. Appropriate circuitry can then place the data on bus 802. Bus 802 carries the data to main memory 806, from which processor 804 retrieves and executes the instructions. The instructions received by main memory 806 may optionally be stored on storage device 810 either before or after execution by processor 804.

5.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving, from a first computing device by a second computing device, a plurality of symbols across a set of lanes of a communication link between the first computing device and the second computing device in one or more clock cycles;
   generating a physical layer extracted host physical address (eHPA) from the plurality of symbols received across the set of lanes of the communication link while performing operations at a physical layer of a receiving (Rx) protocol stack of the second computing device, wherein the eHPA is generated before other operations at other layers of the Rx protocol stack are performed;
   using the eHPA to perform one or more operations for memory access before a normative message is formed by operations of the receiving protocol stack implemented in a communication interface of the second computing device.

2. The method of claim 1, wherein the communication link is implemented with communication protocol operations in accordance with an applicable communication link specification; wherein the normative message is made of data fields represented by syntax elements of the applicable communication link specification.

3. The method of claim 1, wherein the communication link represents one of: a Compute Express Link (CXL), or a non-CXL communication link.

4. The method of claim 1, wherein the one or more operations for memory access include an address translation operation that translates the eHPA into a device physical address (DPA); wherein the DPA references a memory entry in a memory region attached to the second computing device.

5. The method of claim 1, wherein the one or more operations for memory access include a memory read operation that reads valid data from a memory entry in a memory region attached to the second computing device; wherein the one or more operations for memory access include a buffering operation that buffers the valid data from the memory entry in a buffer associated with a transmitting (Tx) protocol stack of the second computing device.

6. The method of claim 1, wherein the generated eHPA is cached in a host physical address (HPA) storage at a first time; wherein valid data read from a memory entry corresponding to the eHPA is cached in a buffer associated with a transmitting (Tx) protocol stack of the second computing device at a second time later than the first time; wherein a data read request message is generated by the Rx protocol stack at a third time later than the second time; wherein the buffered valid data is sent by the second computing device to the first computing device in response to determining that an HPA specified in the data read request message matches the eHPA cached in the HPA storage.

7. The method of claim 1, wherein the generated eHPA is cached in a host physical address (HPA) storage at a first time; wherein a data read request message is generated by the Rx protocol stack at a second time, later than the first time, while valid data is being read from a memory entry corresponding to the eHPA; wherein the valid data is sent by the second computing device to the first computing device, in response to determining that an HPA specified in the data read request message matches the eHPA cached in the HPA storage and that the valid data has been successfully read from the memory entry.

8. The method of claim 1, wherein the plurality of symbols pertains to one of: a data read request message or a speculative data read request message.

9. The method of claim 1, wherein the eHPA is generated based at least in part on real time skew information relating to the set of lanes in the communication link.

10. A computing device comprising:
   one or more computing processors;
   one or more non-transitory computer readable storage media, comprising instructions, which when executed by one or more computing processors cause the one or more computing processors to perform:
      receiving, from a first computing device by a second computing device, a plurality of symbols across a set of lanes of a communication link between the first computing device and the second computing device in one or more clock cycles;

generating a physical layer extracted host physical address (eHPA) from the plurality of symbols received across the set of lanes of the communication link while performing operations at a physical layer of a receiving (Rx) protocol stack of the second computing device, wherein the eHPA is generated before other operations at other layers of the Rx protocol stack are performed;

using the eHPA to perform one or more operations for memory access before a normative message is formed by operations of the receiving protocol stack implemented in a communication interface of the second computing device.

11. The computing device of claim 10, wherein the communication link is implemented with communication protocol operations in accordance with an applicable communication link specification; wherein the normative message is made of data fields represented by syntax elements of the applicable communication link specification.

12. The computing device of claim 10, wherein the communication link represents one of: a Compute Express Link (CXL), or a non-CXL communication link.

13. The computing device of claim 10, wherein the one or more operations for memory access include an address translation operation that translates the eHPA into a device physical address (DPA); wherein the DPA references a memory entry in a memory region attached to the second computing device.

14. The computing device of claim 10, wherein the one or more operations for memory access include a memory read operation that reads valid data from a memory entry in a memory region attached to the second computing device; wherein the one or more operations for memory access include a buffering operation that buffers the valid data from the memory entry in a buffer associated with a transmitting (Tx) protocol stack of the second computing device.

15. The computing device of claim 10, wherein the generated eHPA is cached in a host physical address (HPA) storage at a first time; wherein valid data read from a memory entry corresponding to the eHPA is cached in a buffer associated with a transmitting (Tx) protocol stack of the second computing device at a second time later than the first time; wherein a data read request message is generated by the Rx protocol stack at a third time later than the second time; wherein the buffered valid data is sent by the second computing device to the first computing device in response to determining that an HPA specified in the data read request message matches the eHPA cached in the HPA storage.

16. The computing device of claim 10, wherein the generated eHPA is cached in a host physical address (HPA) storage at a first time; wherein a data read request message is generated by the Rx protocol stack at a second time, later than the first time, while valid data is being read from a memory entry corresponding to the eHPA; wherein the valid data is sent by the second computing device to the first computing device, in response to determining that an HPA specified in the data read request message matches the eHPA cached in the HPA storage and that the valid data has been successfully read from the memory entry.

17. The computing device of claim 10, wherein the plurality of symbols pertains to one of: a data read request message or a speculative data read request message.

18. The computing device of claim 10, wherein the eHPA is generated based at least in part on real time skew information relating to the set of lanes in the communication link.

19. One or more non-transitory computer readable storage media, comprising instructions, which when executed by one or more computing processors cause the one or more computing processors to perform:

receiving, from a first computing device by a second computing device, a plurality of symbols across a set of lanes of a communication link between the first computing device and the second computing device in one or more clock cycles;

generating a physical layer extracted host physical address (eHPA) from the plurality of symbols received across the set of lanes of the communication link while performing operations at a physical layer of a receiving (Rx) protocol stack of the second computing device, wherein the eHPA is generated before other operations at other layers of the Rx protocol stack are performed;

using the eHPA to perform one or more operations for memory access before a normative message is formed by operations of the receiving protocol stack implemented in a communication interface of the second computing device.

20. The media of claim 19, wherein the communication link represents one of: a Compute Express Link (CXL), or a non-CXL communication link.

* * * * *